United States Patent
Simoneau et al.

(10) Patent No.: US 7,415,409 B2
(45) Date of Patent: Aug. 19, 2008

(54) METHOD TO TRAIN THE LANGUAGE MODEL OF A SPEECH RECOGNITION SYSTEM TO CONVERT AND INDEX VOICEMAILS ON A SEARCH ENGINE

(75) Inventors: Laurent Simoneau, St-Augustin (CA); Pascal Soucy, Québec (CA)

(73) Assignee: Coveo Solutions Inc., Québec (CA)

( * ) Notice: Subject to any disclaimer, the term of this patent is extended or adjusted under 35 U.S.C. 154(b) by 0 days.

(21) Appl. No.: 11/949,346

(22) Filed: Dec. 3, 2007

(65) Prior Publication Data

US 2008/0133235 A1    Jun. 5, 2008

Related U.S. Application Data

(60) Provisional application No. 60/891,304, filed on Feb. 23, 2007, provisional application No. 60/868,222, filed on Dec. 1, 2006.

(51) Int. Cl.
*G10L 15/06* (2006.01)
*G10L 15/14* (2006.01)

(52) U.S. Cl. .................. 704/243; 704/244; 704/255; 379/88.01

(58) Field of Classification Search .............. 704/10, 704/231, 243, 244, 255, 256.3; 379/88.01, 379/88.04
See application file for complete search history.

(56) References Cited

U.S. PATENT DOCUMENTS

| | | | |
|---|---|---|---|
| 6,308,151 B1 * | 10/2001 | Smith | 704/235 |
| 6,442,519 B1 | 8/2002 | Kanevsky | |
| 6,507,643 B1 * | 1/2003 | Groner | 379/88.14 |
| 6,775,651 B1 | 8/2004 | Lewis | |
| 6,901,364 B2 * | 5/2005 | Nguyen et al. | 704/235 |
| 7,006,967 B1 | 2/2006 | Kahn | |
| 7,039,579 B2 * | 5/2006 | Epstein et al. | 704/9 |
| 7,272,558 B1 * | 9/2007 | Soucy et al. | 704/235 |
| 7,299,180 B2 * | 11/2007 | Wang et al. | 704/257 |
| 2005/0096908 A1 | 5/2005 | Bacchiani | |
| 2006/0129399 A1 | 6/2006 | Turk | |
| 2007/0041522 A1 | 2/2007 | Abella et al. | |

OTHER PUBLICATIONS

Improved Language Model Adaptation Using Existing and Derived External Resources, Chang, P.-C.; Lee, L Conference: Automatic speech recognition and understanding—IEEE Workshop 2003, pp. 531-536.
Learning Strategies in Speech Recognition Gavat, I; Dumitru, O.; et al., Jun. 8-10, 2005, pp. 237-240.
Language modeling for automatic speech recognition in telehealth, Zhang, Xiaojia, p. 370, Dec. 2005.
New Technology lets you read your voice mail, Apr. 6, 2007.
SCANMail: a voice interface that makes speech browsable, readable and searchabte, CHI 2002, pp. 275-282.

(Continued)

*Primary Examiner*—Martin Lerner
(74) *Attorney, Agent, or Firm*—Ogilvy Renault LLP

(57) ABSTRACT

A method and a related system to index voicemail documents by training a language model for a speaker or group of speakers by using existing emails and contact information on available repositories.

4 Claims, 4 Drawing Sheets

OTHER PUBLICATIONS

Automatic speech recognition performance on a voicemail transcription task, IEEE, Oct. 2002, vol. 10, No. 7, pp. 433-442.

Let's hear for audio mining, LEAVITT, N., Computer vol. 35, No. 10, pp. 23-25, Oct. 2002.

WITS 2001, Voice Mail Productivity Services, http://www.wits2001.com/ps/vm_prod_tools.aspx.

Evolution of the performance of automatic speech recognition algorithms in transcribing conversational telephone speech, Padmanabhan, M. et al. Part 3, pp. 1926-1931 vol. 3, May 21-23, 2001.

Automatic transcription of voicemail at AT&T, Bacchiani, M., vol. 1, pp. 25-28, 2001.

* cited by examiner

METHOD TO TRAIN THE LANGUAGE MODEL OF A SPEECH RECOGNITION SYSTEM TO CONVERT AND INDEX VOICEMAILS ON A SEARCH ENGINE

CROSS-REFERENCE TO RELATED APPLICATIONS

This application claims priority under 35USC§119(e) of U.S. provisional patent application 60/891,304, filed on Feb. 23, 2007, the specification of which is hereby incorporated by reference. This application also claims priority under 35USC§119(e) of U.S. provisional patent application 60/868,222, filed on Dec. 1, 2006, the specifications of which are hereby incorporated by reference.

TECHNICAL FIELD

The present invention relates to the field of information retrieval, and more particularly, to search engines such as those used on corporate networks (for instance, intranets). The invention is also related to speech recognition systems and the search of content in voicemails.

BACKGROUND OF THE INVENTION

A search engine is a system that retrieves information from a database. Here, a database can be any type of repository containing electronic documents, for instance: the Web, mailing archives, file repositories, etc. Documents can contain text, images, audio and video data. Most search engines only index the textual part of documents.

A speech recognition engine automatically converts spoken words from an audio stream into electronic text. The result of the operation is named a "transcription". There are two-types of speech recognition systems: those that are speaker-dependent (trained and optimized to for specific speakers) and those that are speaker-independent (needing no training for specific speakers).

Speech recognition engines generally use language models Language models are probabilistic distributions on sequences of words. These models define the probability of the next word based on a sequence. Both speaker-dependent and speaker-independent systems can have language models. Some speech recognition software provide training tools to train the language model by supplying training data. These systems modify their pre-determined language model with new probabilities estimated from the additional training text supplied by the user of the software. For instance, a system can be packaged with a "US-English" language model, which captures the statistics of the generation of English in the general US population. While this language model is adequate to transcribe speech in English when no other information on the content to be converted is known, a specific speaker or group of people (for instance, people working for the same organization) may need a better optimized language model to reflect their particular use of the English language. For instance, technical words, people, products and model names, etc., are unlikely to be properly recognized by a general language model.

These systems also use dictionaries that define the set of word candidates. On certain systems, the dictionary can also be modified by the user of the speech recognition system.

Improvements are desired to make searching of voice files easier, faster and more accurate.

SUMMARY OF THE INVENTION

The modification of the dictionary and training of the language model allow a user to specifically optimize the speech recognition engine for a specific domain. In this document, the result of the training of a language model is named a speech recognition profile. For instance, a support center having all voicemails archived may want to optimize the language model to reflect the greater use of terms related to its product line in order to maximize the accuracy of the transcription and efficiently search and retrieve these voicemails.

Suppose a technology company called ABC sells wireless devices. This company has a toll free number and an email dedicated to customer support. The company wants to archive all information exchanged between the support team and customers and be able to search the archive. A speech recognition engine can convert speech into text, which can then be indexed to match user queries and retrieve voicemail documents. However, a speech recognition engine is usually packaged with a general US-English language model (or, sometimes, a domain specific language model). When the engine tries to recognize technical words, people and model names, etc, it often fails because the dictionary does not contain these specific words. Moreover, the language model does not reflect the probabilistic distribution of known terms, such as "wifi" and "wireless", that are more frequently used by ABC's support team and customers than by the general US population. A way to improve the speech recognition accuracy, and thus the accuracy of the retrieval of the voicemails, consists of asking ABC's knowledge managers to train the speech recognition engine by using relevant texts that would capture the language model of the support team of ABC. However, most enterprises do not have the expertise to do such training. Another problem arises from the names of people and organizations referred to in the voicemails of specific customers that are unlikely to be properly recognized. To better improve the speech recognition for a specific customer or group of customers, it is possible to train a specific speech recognition profile. Again, a major difficulty with this approach is that this training has to be done by experts, which results in increased costs and delays.

This invention enables automatic training of language models and creation of specific profiles for individual or groups of speakers in order to improve the accuracy of a speech recognition system used to transcribe voicemails. The resulting transcriptions are then indexed using the search engine and content of the original voicemails can thus be searched and retrieved.

The present invention provides a method and system related to indexing voicemails and automatically training the language model of a speech recognition system according to the context of a specific user or organization.

According to an embodiment, the present invention provides a method and system to retrieve voicemails. The method comprises providing an email source comprising email documents; providing a database of contacts (electronic business cards); retrieving the textual content of the email documents; linking email documents to related contacts; constituting a training data set for each group of contacts; training a speech recognition profile for each group of contacts using related training data set; providing a source of voicemails; retrieving the voicemails from the source; linking each voicemail to a group of contacts; converting each voicemail into a transcription using its related speech recognition profile; and indexing the transcriptions.

According to an embodiment, there is provided a method for training a language model of a speech recognition engine.

The method comprises: providing an email source comprising email documents; retrieving at least one of the email documents from the email source; extracting textual content from the at least one email document; providing a contact source comprising contacts; retrieving at least one of the contacts from the contact source; extracting contact data from the at least one contact, the contact data comprising at least one of a person's name and email address; forming a training set comprising the at least one email document, the at least one email document having recipient or sender information that comprises the at least one of a person's name and email address; training the language model using the textual content from the at least one email document in the training set to produce a speech recognition profile for the at least one contact; and saving the speech recognition profile for the at least one contact.

According to an embodiment, the method of training further comprises: providing a voicemail source comprising voicemail documents; retrieving the voicemail documents from the voicemail source; extracting audio content from the voicemail documents; converting the audio content into transcriptions using the speech recognition profile; and indexing the transcriptions thereby resulting in an indexing of the voicemail documents.

According to an embodiment, there is provided a method of searching for voicemail documents comprising: querying a database with a given search criterion, the database comprising transcriptions indexed according to the method described above; displaying the search results to a user.

According to an embodiment, there is provided a search engine for indexing voicemail documents according to the method of indexing described above.

BRIEF DESCRIPTION OF THE DRAWINGS

Further features and advantages of the present invention will become apparent from the following detailed description, taken in combination with the appended drawings, in which.

DETAILED DESCRIPTION

Figure 1:
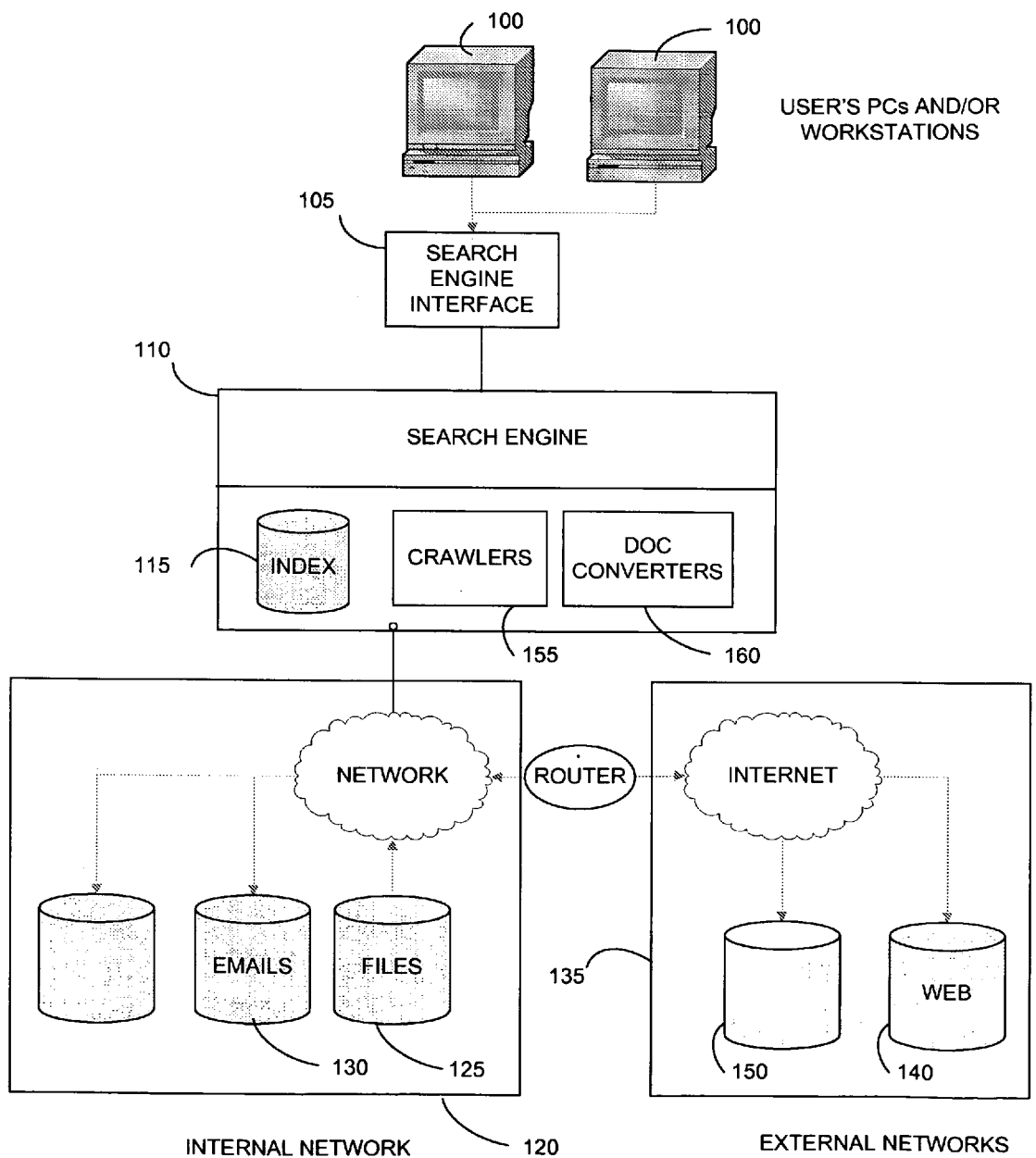
FIG. 1 is a diagram illustrating the system architecture including a search engine used in the context of the methods described herein.

Referring to the figures, FIG. 1 illustrates the functionality of a system incorporating a search engine on a corporate network used in the context of the methods described herein. A PC or Workstation 100 submits queries to the search engine interface 105. The search engine interface 105 communicates data to the search engine system 110. The search engine takes the query inputted to the interface 105 by a user and consults the index (database) 115 to answer the query. The index 115 is built by acquiring documents from many locations, which may comprise the internal network 120, where files 125 and emails 130 are stored, and/or the external network 135, where Web documents 140 are crawled. Documents found in other databases 150 may also be retrieved. Crawlers 155 are processes that scan and retrieve documents on repositories, storage centers, etc. The documents thus retrieved are converted by document converters 160 in order to extract textual content and metadata from the documents. Emails from an email source can hence be obtained by crawling and retrieving documents from at least one of a messaging system; a database; a messaging system on a web site; and a file repository.

Figure 2:
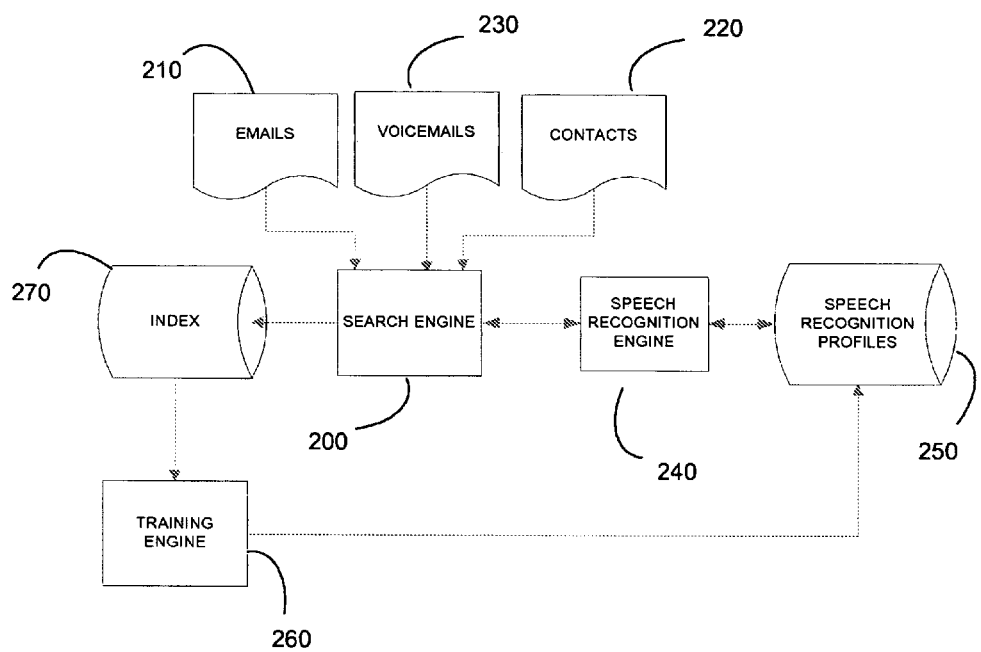
FIG. 2 is a diagram illustrating a search engine that uses a speech recognition system to index voicemails content according to an embodiment.

Still referring to the figures, FIG. 2 illustrates the architecture of the system comprising a search engine 200 that uses a speech recognition engine 240 to index voicemails by automatically training speech recognition profiles 250. The Search Engine 200 indexes emails with textual content 210 and retrieves contact information 220. Voicemails 230 to be indexed are also retrieved by the search engine 200. The speech recognition engine 240 uses speech recognition profiles 250 trained by a training engine 260 to create transcriptions to be indexed by the search engine. The training engine 260 gets its data from index 270, where the search engine 200 has saved the data. This data comprises the original textual content from the emails 210, relevant metadata from these emails, and metadata from contact information 220 such as people and company names and phone numbers.

Figure 3:
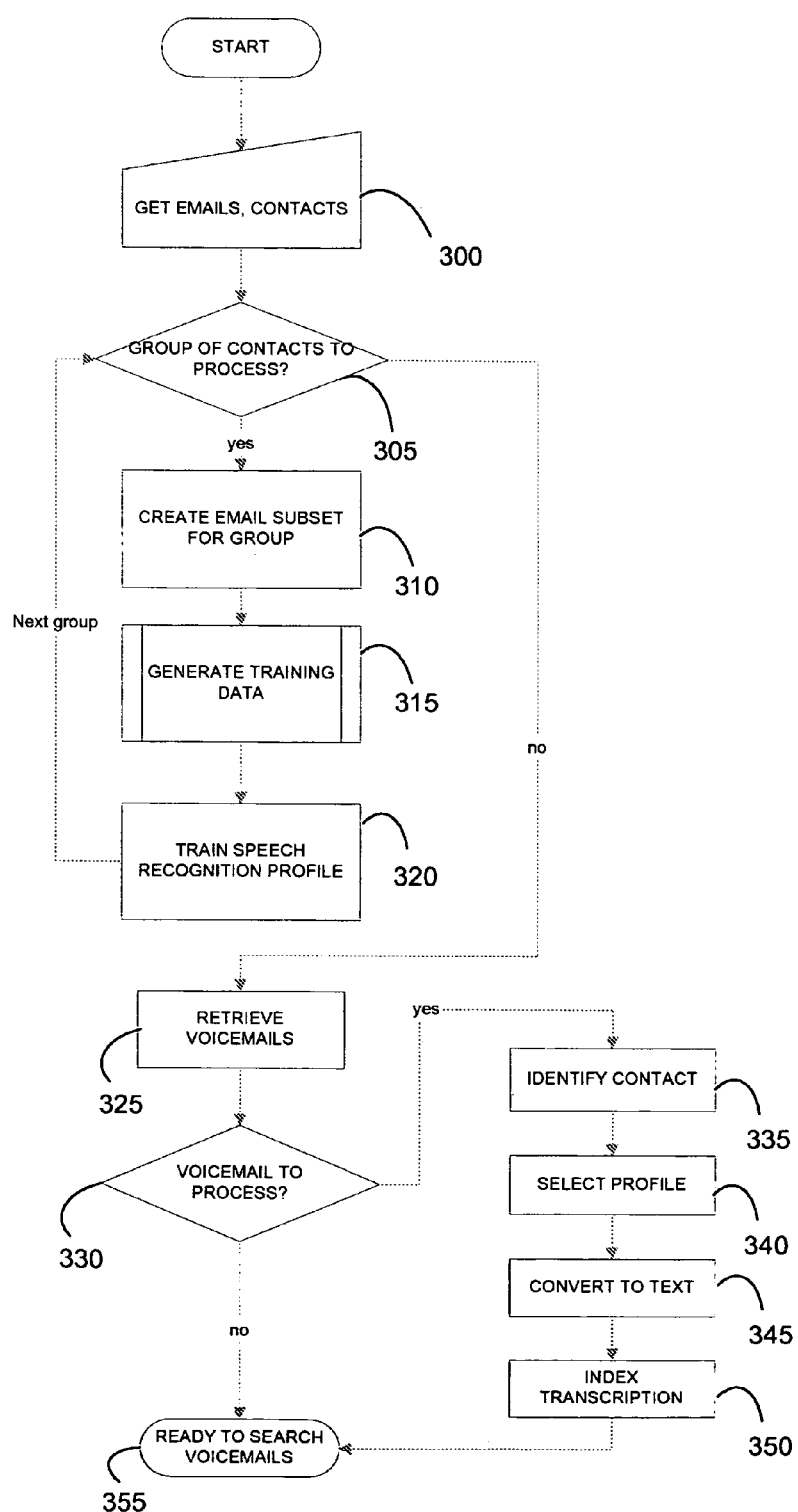
FIG. 3 is a flowchart of the steps performed by the search engine during the indexing of voicemails content according to an embodiment.
Figure 4:
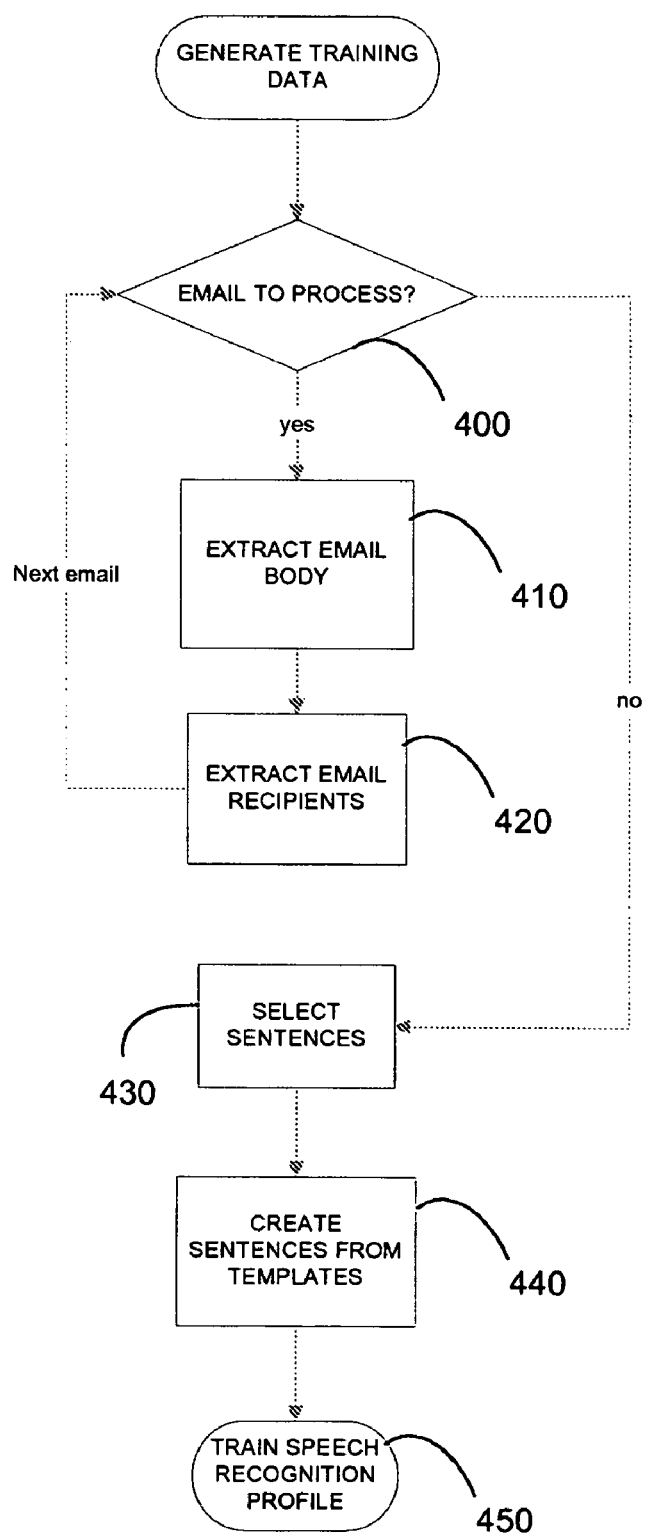
FIG. 4 is a flowchart of the steps performed by the search engine while creating the training data to be used to train the language model of a contact and generate its corresponding speech recognition profile according to an embodiment.

In an embodiment and still referring to the figures, FIG. 3 is a flowchart displaying the steps performed by the search engine to index and train the speech recognition engine according to an embodiment. The method therefore may further comprise grouping contacts into groups, each group comprising at least one contact; generating, for each group of contacts, the training set using the contact data for the contacts in the group and using the textual content of the email documents whose recipient or sender contains a string that at least partially matches a person's name and email address; and the training comprises training the language model using the training set. Now returning to FIG. 3, first at 300, the source of emails and contact information to index (for instance, a Microsoft Exchange Server) is obtained from the administrator of the search engine. The system will then process each defined group of contacts (a contact is an electronic business card, containing for instance the name of the person, the company, the phone number and email where that person can be reached) by verifying at 305 whether there are still groups of contacts or not. At 310, a subset of emails is created for the group being processed. This subset is the set of all emails processed at 300 in which the current group contains a contact that is either the sender (from:) or the recipient (to:) of the email (i.e., in which at least part of the contact data is present), thus linking emails with a group of contacts. The relation between a contact and an email is done by first comparing the email addresses. If the email address is not present in the contact information, the name of the person is used instead. At 315, the training data is created by using the subset collected at 310. This training data can be constituted using different approaches. Refer to FIG. 4 as it describes a specific approach. At 320, the training data is used to train a language model (using, for instance, a language model training tool provided by the speech recognition software). The result of this process is a speech recognition profile to be used with voicemails sent by speakers belonging to the current group of contacts. When all groups have been processed, the voicemails to index are retrieved from a database at 325. For each voicemail starting at 330, the related group of contacts for this voicemail is found at 335. To determine which group of contacts is related to the voicemail, the system uses the phone number of the voicemail sender which is saved along with the voicemail in the voicemail repository (or voicemail source) (i.e., identifying the contact associated to a person leaving the given voicemail). The phone number is then looked up among the contacts of each group of contacts. If a contact card for this phone number is found, then the corresponding profile is selected at 340. If not, a general profile is used to process this voicemail. At 345, the voicemail is converted to text by using a speech recognition software with the selected speech recognition profile. At 350, the transcription is indexed by the search engine and the content of the voicemails is thus available to be searched by users at 355. The identifying the contact of the person leaving the given voicemail may be conducted by obtaining identification information of the device from which the voicemail originates and retrieving the contact that contains the identification information.

Still referring to the figures, FIG. 4 is the flowchart of the training data generation process. For each email in the subset starting at 400, the text part of the body of the email is first extracted at 410. Then, at 420, the list of all email recipients is extracted and kept in a list. When all emails have been processed at 430, the system has a set of email bodies and a list of email addresses (duplicates are removed). At 430, the system selects a subset of all available sentences from the email bodies. There are many ways to do this selection, for instance, a threshold can be used and sentences can be selected up to this threshold in the order they appear. At 440, new sentences are created from predefined templates. Examples of templates used are:

T1: Hello, this is <contact_fullname> from <company> calling.

T2: Hi <recipient_first_name>, it's <contact_firstname>.

Etc.

These templates are filled with the information in each contact card. Suppose company ABC is using the system to recognize voicemails from customers and the following contact: *James Smith, XYZ Inc.,* 555-555-5555, and that emails in the subset from this customer were addressed to the following ABC support team members; Yan Pederson and Mike Johnson. Thus, the following sentences would be added:

S1: Hello, this is James Smith from XYZ calling.

S2: Hi Yan, it's James,

S3: Hi Mike, it's James.

Etc.

Thus, the training set comprises general textual data from the emails exchanged between this customer and the support team, and the sentences created from the templates to simulate common sentences used over the phone. This training improves the accuracy of speech recognition systems which are generally inaccurate at recognizing person names and organizations. The email bodies also likely contain technical terms, product names and other people names that are particularly related to the speaker, thus modeling more precisely his language model. At 450, this part of the process is completed and the system is ready to be trained using the training set.

While illustrated in the block diagrams as groups of discrete components communicating with each other via distinct data signal connections, it will be understood by those skilled in the art that embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment.

It should be noted that the present invention can be carried out as a method, can be embodied in a system, a computer readable medium or an electrical or electro-magnetic signal.

The embodiments of the invention described above are intended to be exemplary only. The scope of the invention is therefore intended to be limited solely by the scope of the appended claims.

We claim:

1. A method for training a language model of a speech recognition engine, the method comprising:

extracting textual content from email documents from an email document source;

extracting contact data from a contact from a contact source comprising contacts, the contact data comprising at least one of a person's name and email address;

forming a training set comprising the email documents, the email documents each having recipient or sender information that comprises the at least one of a person's name and email address, the forming a training set further comprises:

extracting metadata from the email documents;

providing manually created sentence templates;

creating new training sentences by filling the sentence templates using the metadata; and adding the new training sentences to the training set; and training the language model using the textual content from the email documents and the new training sentences in the training set to produce a speech recognition profile for the contact.

2. The method of claim 1, further comprising grouping contacts into groups, each group comprising at least one contact; generating, for each group of contacts, the training set using the contact data for the contacts in the group and using the textual content of the email documents whose recipient or sender contains a string that at least partially matches a person's name and email address; and the training comprises training the language model using the training set.

3. The method of claim 1, further comprising:

extracting audio content for a given voicemail from a voicemail source; identifying the contact associated to a person leaving the given voicemail; selecting the speech recognition profile that corresponds to the identified contact;

converting said audio content of the voicemail into a transcription using the selected speech recognition profile; and indexing the transcriptions thereby resulting in an indexing of the voicemails.

4. The method of claim 3 wherein said identifying the contact of the person leaving the given voicemail is conducted by obtaining identification information of the device from which the voicemail originates and retrieving the contact that contains the identification information.

* * * * *